United States Patent [19]
Tatsumi

[11] Patent Number: 4,520,680
[45] Date of Patent: Jun. 4, 1985

[54] TORQUE MEASURING APPARATUS
[75] Inventor: Takumi Tatsumi, Himeji, Japan
[73] Assignee: Mitsubishi Denki Kabushiki Kaisha, Tokyo, Japan
[21] Appl. No.: 486,963
[22] Filed: Apr. 20, 1983
[30] Foreign Application Priority Data
Apr. 26, 1982 [JP] Japan .................................. 57-72390
Apr. 26, 1982 [JP] Japan .................................. 57-72391
[51] Int. Cl.³ .............................................. G01L 3/14
[52] U.S. Cl. ............................. 73/862.19; 73/862.36
[58] Field of Search ........... 73/862.19, 862.17, 862.18, 73/862.36

[56] References Cited
U.S. PATENT DOCUMENTS
2,311,331 2/1943 Ericson ............................ 73/862.19
2,642,740 6/1953 Stephenson et al. .............. 73/862.17

FOREIGN PATENT DOCUMENTS
0399745 2/1974 U.S.S.R. ............................ 73/862.19

Primary Examiner—Charles A. Ruehl
Attorney, Agent, or Firm—Wenderoth, Lind & Ponack

[57] ABSTRACT

The present invention relates to a torque measuring apparatus wherein an electromagnetic powder clutch is interposed between a power source and a load which is driven by the power source, wherein an exciting current of the electromagnetic powder clutch is controlled, to establish a slight slip state between an input side and an output side of the electromagnetic powder clutch, and wherein the exciting current of the electromagnetic powder clutch in the slight slip state is measured, thereby to measure the torque which is transmitted from the power source to the load.

2 Claims, 3 Drawing Figures

4,520,680

TORQUE MEASURING APPARATUS

BACKGROUND OF THE INVENTION

The present invention relates to a torque measuring apparatus. More particularly, it relates to an apparatus which is installed between a power source such as an electric motor or an internal combustion engine and a load to be driven by the power source and which measures the torque transmitted from the power source to the load.

An electromagnetic powder clutch transmits a torque by utilizing the magnetic coupling force of electromagnetic powder which develops when the electromagnetic power obtained by finely pulverizing a magnetic material is magnetized. It has heretofore been known that the transmission torque capacity of the electromagnetic powder clutch is substantially proportional to an exciting current flowing through an exciting coil of the clutch, without appreciable regard to the difference between the revolutions of the input and output sides of the electromagnetic powder clutch, i.e., the slip revolution number of the electromagnetic powder clutch.

SUMMARY OF THE INVENTION

The present invention has been made by skilfully exploiting the characteristics of the electromagnetic powder clutch as described above, and has for its object to provide a torque measuring apparatus having a construction wherein an electromagnetic powder clutch is interposed between a power source and a load to be driven by the power source, an exciting current of the electromagnetic powder clutch is reduced at a predetermined reduction rate in case of measuring a torque, the exciting current at the point of time at which a slip arises in the electromagnetic powder clutch is measured, the exciting current being simultaneously increased again, and the torque transmitted from the power source to the load is measured in the form of a current value of the measured exciting current; the apparatus being non-responsive to electrical noise and being mechanically firm.

BRIEF DESCRIPTION OF THE DRAWINGS

FIGS. 2 and 3 show the torque characteristics of an electromagnetic powder clutch utilized in FIG. 1 wherein FIG. 2 illustrates the torque capacity versus the exciting current, while FIG. 3 illustrates of the slip revolution number versus the exciting current characteristics of the clutch.

DESCRIPTION OF THE PREFERRED EMBODIMENT

Figure 1:
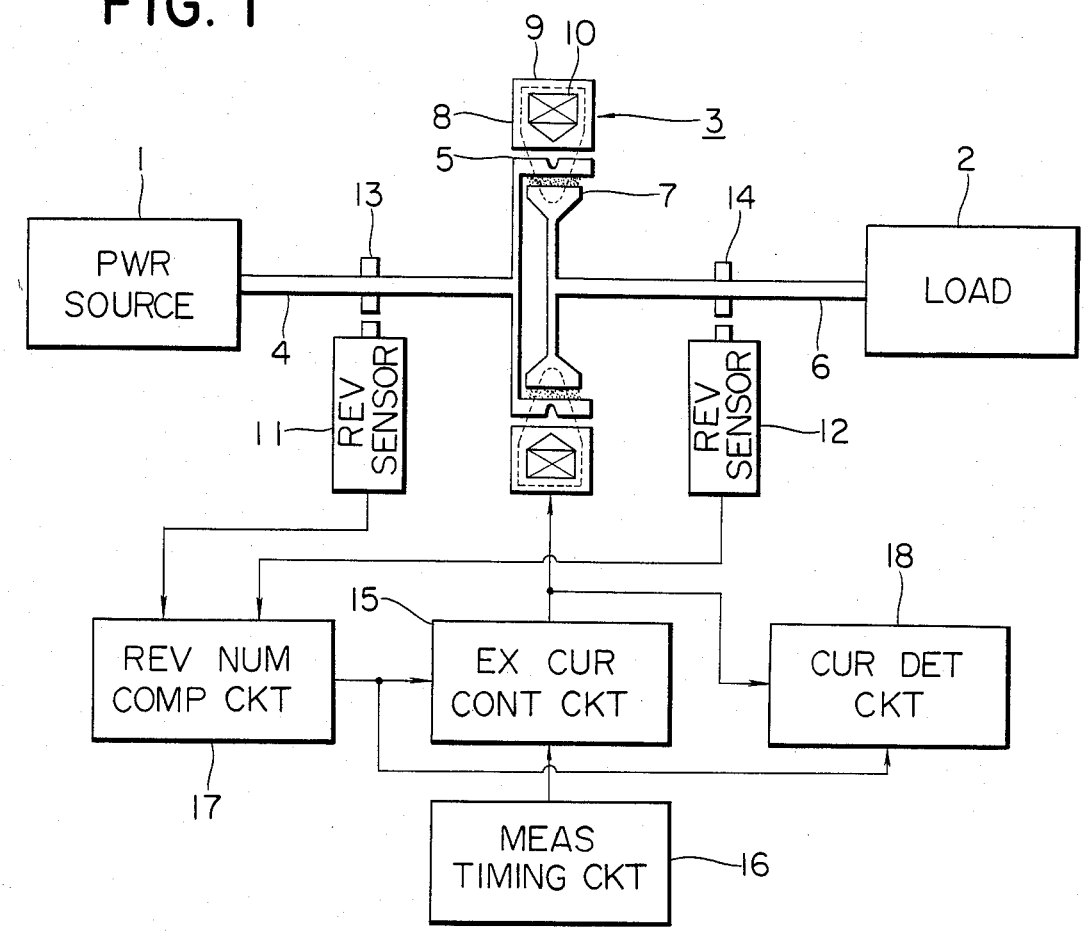
FIG. 1 is a schematic arrangement diagram showing a torque measuring apparatus according to an embodiment of the present invention.

FIG. 1 is a schematic arrangement diagram which shows a torque measuring apparatus embodying the present invention.

Referring to FIG. 1, numeral 1 designates a power source such as an electric motor or an internal combustion engine, and numeral 2 a load which is driven by the power source 1. Numeral 3 indicates an electromagnetic powder clutch. The clutch 3 is constructed of a rotary section made up of a drive member 5 which is connected to an output shaft 4 of the power source 1 to rotate unitarily therewith, a driven member 7 which is connected to an input shaft 6 of the load 2 to rotate unitarily therewith, and electromagnetic powder 8 which is thinly packed in an annular air gap defined between the inner peripheral surface of the drive member 5 and the outer peripheral surface of the driven member 7 and a stationary section made up of an exciting coil 10 which is enclosed in a yoke 9 and which is wound to be annular. The drive member 5, driven member 7 and yoke 9 are all made of a magnetic material. Accordingly, when an exciting current flows through the exciting coil 10, a magnetic flux is generated by the exciting coil 10 and magnetizes the electromagnetic powder 8 through a path which is indicated by a dotted line in FIG. 1. Therefore, the drive member 5 and the driven member 7 are coupled to each other by the magnetic coupling force of the electromagnetic powder 8 therebetween, thereby transmiting a torque corresponding to the coupling force.

Numerals 11 and 12 denote revolution sensors which detect the numbers of revolutions of the power source 1 and the load 2, respectively. In the present embodiment, the sensors 11 and 12 comprise magnetic pickups which provide frequency signals proportional to the numbers of revolutions of gears 13 and 14 that are respectively mounted on the output shaft 4 and the input shaft 6 which, in turn, are made of a magnetic material.

Numeral 15 denotes an exciting current control circuit which adjusts the exciting current flowing through the exciting coil 10 of the electromagnetic powder clutch 3, numeral 16 a measurement timing circuit which instructs the timing of measuring a torque, and numeral 17 a revolution number comparator circuit which receives the output signals of the revolution sensors 11 and 12 as its inputs and which detects the occurrence of the difference of the number of revolutions between them. Upon receiving a signal from the measurement timing circuit 16, the exciting current control circuit 15 reduces the exciting current at a predetermined reduction rate. On the other hand, the exciting current control circuit 15 restores the reduced exciting current to its original value when the revolution number comparator circuit 17 has detected the occurrence of the difference between the number of revolutions of the revolution sensors 11 and 12.

Shown at numeral 18 is a current detector circuit which responds to the signal of the revolution number comparator circuit 17 to detect the exciting current at the time of the occurrence of the difference between the number of revolutions, and which holds the value of the detected exciting current, for a given time.

Figure 2:
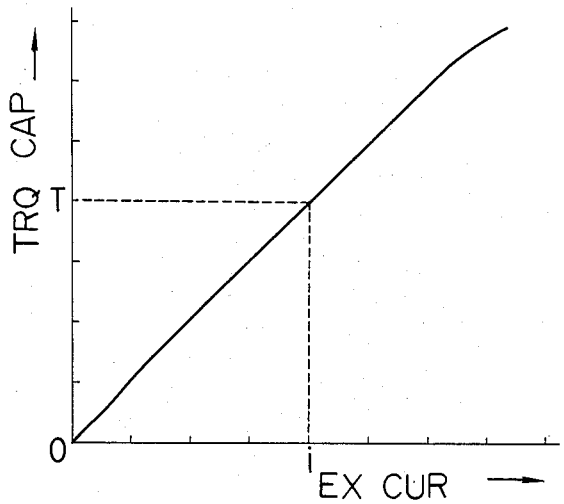
Figure 3:
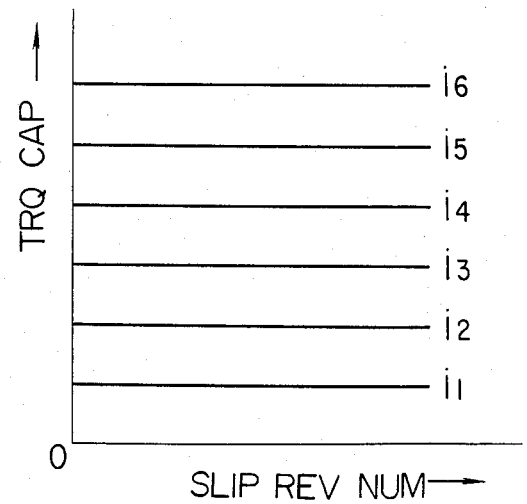

FIGS. 2 and 3 show an example of the torque characteristics of the electromagnetic powder clutch 3 in FIG. 1 wherein FIG. 2 illustrates the torque capacity versus the exciting current, while FIG. 3 illustrates the slip revolution number versus the exciting current ($i_1$–$i_6$) characteristics of the clutch, respectively.

As clearly shown in FIG. 2, the torque capacity is substantially proportional to the exciting current for the region where magnetic saturation does not occur.

Next, the operation of the torque measuring apparatus shown in FIG. 1 will be described with reference to FIG. 2.

It is now supposed that the power source 1 is in its operating state and the exciting current is flowing through the exciting coil 10 of the electromagnetic powder clutch 3 as indicated by i in FIG. 2. The torque capacity of the electromagnetic powder clutch 3 at the exciting current i is denoted by T. When the torque capacity T is not less than a required torque for the rotation of the load 2, the electromagnetic powder clutch 3 does not slip, and the load 2 rotates at the same revolution number as that of the power source 1. When, under this state, the exciting current flowing through the exciting coil 10 is reduced, the torque capacity of the electromagnetic powder clutch 3 decreases in proportion to the exciting current, and becomes less than the required torque for rotation of the load 2. As a result, a slip arises in the electromagnetic powder clutch 3, and the revolution number of the load 2 decreases accordingly. The torque capacity of the electromagnetic powder clutch 3 at the time at which the slip begins to arise therein, is equal to the torque required for driving the load 2, and this torque capacity can be expressed by the exciting current at the time at which the electromagnetic powder clutch 3 has begun to slip.

It is assumed that a proper exciting current, which establishes a torque capacity not less than the torque required for driving the load 2, is kept flowing through the electromagnetic powder clutch 3 by the exciting current control circuit 15. When, under this state, a measurement command signal is provided by the measurement timing circuit 16, the exciting current control circuit 15 reduces the exciting current at the predetermined reduction rate. Accordingly, the torque capacity of the electromagnetic powder clutch 3 decreases substantially in proportion to the exciting current. Thus, the torque capacity of the electromagnetic powder clutch 3 becomes less than the torque required for rotation of the load 2, and a slip occurs. This slip is detected by the revolution number comparator circuit 17 whose input signals are the outputs of the respective revolution sensors 11 and 12, and the current detector circuit 18 detects the exciting current at that time. On the other hand, the exciting current control circuit 15 receives the signal of the revolution number comparator circuit 17 and rapidly restores the reduced exciting current therefrom to bring the electromagnetic powder clutch 3 into the slipless state again. Since the exciting current detected by the current detector circuit 18 is the current at the time at which the slip has occurred in the electromagnetic powder clutch 3, the value of this current is substantially proportional to the torque required for rotation of the load 2. It is provided as a torque measurement value after, if necessary, being held for a suitable time.

While a single measuring operation has been explained in the above embodiment, the required torque to drive a given load can also be measured substantially continuously in such a way that an oscillator which generates output signals at given periods is used as the measurement timing circuit 16 and that the holding time of the current detector circuit 18 is synchronized with the period of the measurement timing circuit 16.

As set forth above, a torque measuring apparatus according to the present invention consists in a construction wherein an electromagnetic powder clutch which can control a timing torque transmitted therethrough as a function of an exciting current flowing therein is interposed between a power source and a load, and wherein, during ordinary running, the exciting current of the electromagnetic powder clutch is held at a value at which no slip arises in the electromagnetic powder clutch, and while measuring a required torque to be transmitted through the clutch, the torque capacity is lowered for a short time and the exciting current at the beginning of a slip in the clutch is measured, thereby to measure the torque which is transmitted from the power source to the load. Therefore, the apparatus has the merit that the slip loss of the electromagnetic powder clutch doesn't occur at the measurement of the torque being transmitted. Moreover, since a comparatively exact measurement current value is obtained, the apparatus exhibits a high electric-noise immunity. Furthermore, since the apparatus can be put into a mechanically firm structure, it is satisfactorily usable under severe mechanical conditions of service environment where vibrations, shocks, etc., exist.

What is claimed is:

1. A torque measuring apparatus for measuring a torque which is transmitted from a power source to a load, comprising an electromagnetic powder clutch which is interposed between a power source and a load driven by said power source, means for controlling an exciting current of said electromagnetic powder clutch so as to establish a slight slip state between an input side and an output side of said electromagnetic powder clutch, and means to measure the exciting current of said electromagnetic powder clutch in the slight slip state, thereby to measure the transmission torque.

2. A torque measuring apparatus for measuring a torque which is transmitted from a power source to a load, comprising an electromagnetic powder clutch which is interposed between a power source and a load driven by said power source, means for reducing an exciting current of said electromagnetic powder clutch at a predetermined reduction rate in case of measuring the torque and also to increase the exciting current again after the measurement of the torque, and means to measure the exciting current at a time at which a slip arises in said electromagnetic powder clutch, the transmission torque being measured in the form of a current value of the measured exciting current.

* * * * *